US012807204B2

(12) United States Patent
Foster et al.

(10) Patent No.: US 12,807,204 B2
(45) Date of Patent: Nov. 24, 2026

(54) HYBRID CART

(71) Applicant: Rehrig Pacific Company, Los Angeles, CA (US)

(72) Inventors: Derick Foster, Cumming, GA (US); Travis James Englert, Brea, CA (US)

(73) Assignee: Rehrig Pacific Company, Monterey Park, CA (US)

( * ) Notice: Subject to any disclaimer, the term of this patent is extended or adjusted under 35 U.S.C. 154(b) by 363 days.

(21) Appl. No.: 18/308,735

(22) Filed: Apr. 28, 2023

(65) Prior Publication Data

US 2023/0347957 A1 Nov. 2, 2023

Related U.S. Application Data

(60) Provisional application No. 63/336,911, filed on Apr. 29, 2022.

(51) Int. Cl.
*B62B 3/06* (2006.01)
*B62B 3/10* (2006.01)
(Continued)

(52) U.S. Cl.
CPC .............. *B62B 3/0618* (2013.01); *B62B 3/10* (2013.01); *B62B 5/004* (2013.01); *B62B 5/0069* (2013.01); *B65D 19/04* (2013.01); *B65D 19/40* (2013.01); *B65D 2519/00034* (2013.01); *B65D 2519/00069* (2013.01); *B65D 2519/00174* (2013.01); *B65D 2519/00268* (2013.01); *B65D 2519/00278* (2013.01); *B65D 2519/00771* (2013.01); *B65D 2519/00791* (2013.01); *B65D 2519/0094* (2013.01)

(58) Field of Classification Search
CPC ......... B62B 3/0618; B62B 3/10; B62B 5/004; B62B 5/0069; B62B 5/063; B62B 5/087; B62B 2501/02; B62D 19/04; B62D 19/40; B65D 19/04; B65D 19/40
See application file for complete search history.

(56) References Cited

U.S. PATENT DOCUMENTS 5,267,516 A * 12/1993 Abrahamson ...... B65D 71/0096 206/597
5,595,259 A * 1/1997 Gilliland ............. B62D 51/001 180/332

(Continued)

OTHER PUBLICATIONS

Office Action for Mexican Patent Application No. MX/a/2023/005036 dated Jun. 23, 2026.

*Primary Examiner* — Glenn F Myers
(74) *Attorney, Agent, or Firm* — Carlson, Gaskey & Olds, P.C.

(57) ABSTRACT

A cart includes a base, a pair of rear wheels supporting the base, and a pair of tines extending forward of the base. A load wheel is positioned below forward ends of each of the pair of tines for raising and lowering the tine. A handle extends upward from the base, the handle including a horizontal handle, wherein the horizontal handle is substantially aligned with the axles of the rear wheels. The tines are wider and longer so that each tine can support two small nestable pallets. Each nestable pallet includes a deck, feet supporting the deck and a peripheral lip extending upward from the deck. The pallet is sized to support single stack of containers, such as standard-size totes.

26 Claims, 14 Drawing Sheets

(51) Int. Cl.

| | |
|---|---|
| ***B62B 5/00*** | (2006.01) |
| ***B65D 19/04*** | (2006.01) |
| ***B65D 19/40*** | (2006.01) |

(56) References Cited

U.S. PATENT DOCUMENTS

| | | | | |
|---|---|---|---|---|
| 6,938,905 | B1 * | 9/2005 | Tsai | B62B 1/12 280/30 |
| 9,205,882 | B1 * | 12/2015 | Hoffman | B66F 9/06 |
| 10,793,173 | B2 | 10/2020 | Kalinowski et al. | |
| 10,988,154 | B2 * | 4/2021 | Englert | B62B 5/0043 |
| 11,618,489 | B2 | 4/2023 | Kalinowski et al. | |
| 12,384,439 | B2 | 8/2025 | Foster et al. | |
| 2006/0032411 | A1 * | 2/2006 | Hummel | B65D 19/0097 108/56.1 |
| 2015/0102274 | A1 * | 4/2015 | He | B66F 9/08 254/2 C |
| 2015/0246375 | A1 * | 9/2015 | Hinkle | B08B 3/024 134/123 |
| 2018/0009643 | A1 * | 1/2018 | Hoffman | B66F 9/24 |
| 2018/0065653 | A1 * | 3/2018 | Rusche | B21D 22/02 |
| 2020/0269895 | A1 * | 8/2020 | Englert | B62B 3/0612 |
| 2020/0269896 | A1 | 8/2020 | Kalinowski | |
| 2020/0385041 | A1 * | 12/2020 | Jiang | B66F 9/065 |
| 2021/0292145 | A1 * | 9/2021 | Theos | G05D 1/0066 |
| 2022/0315086 | A1 | 10/2022 | Englert et al. | |
| 2025/0187643 | A1 | 6/2025 | Popovits, II et al. | |

* cited by examiner

HYBRID CART

BACKGROUND

Many stores, such as grocery stores, offer delivery services or curbside pickup services. Users can place an order online. A store worker fills the order by placing the requested items in containers (such as plastic totes) on a cart. The cart and containers may be stored in a back room before being moved out of the store to either a delivery vehicle or to the customer's vehicle.

SUMMARY

A cart includes a base, a pair of rear wheels supporting the base, and a pair of tines extending forward of the base. A load wheel is positioned below forward ends of each of the pair of tines for raising and lowering the tine.

The load wheels may have hub motors within for driving the cart.

A handle extends upward from the base. The handle may include a horizontal handle that is substantially aligned with the axles of the rear wheels.

The tines of the cart may be wider and longer so that each tine can support two small nestable pallets.

Each nestable pallet includes a deck, feet supporting the deck and a peripheral lip extending upward from the deck. The pallet is sized to support single stack of containers, such as standard-size totes.

The powered cart disclosed herein increases efficiencies by reducing the amount of time and labor an operator needs to move product. For example, the containers may each contain grocery items that a customer has ordered online for delivery or pickup. Each container would contain the grocery items for only one customer order, but a customer order may fill several containers. Similar items may be groups, e.g. the containers with items that need to be refrigerated could be stacked on one pallet, while the containers with items that need to be frozen could be stacked on another pallet, and the containers with items that can be held at room temperature could be stacked on yet another pallet. As appropriate, each pallet with its containers could be held in a refrigerator, a freezer or in a storeroom until near delivery or pickup time. The store worker would then gather up these different pallets in different locations with the cart, move all of them out to the parking lot adjacent the store, and either place them in the customers' vehicles or into a delivery vehicle.

The electric hub motors provide propulsion in forward and reverse to the powered cart. The powered drive is especially useful when moving heavy loads across parking lots, up ramps and slopes, and over thresholds that may be encountered throughout the process. The battery pack may also provide power to lift the pallet load, or a hydraulic foot pump may be utilized, similar to an existing delivery cart.

DETAILED DESCRIPTION

Figure 1:
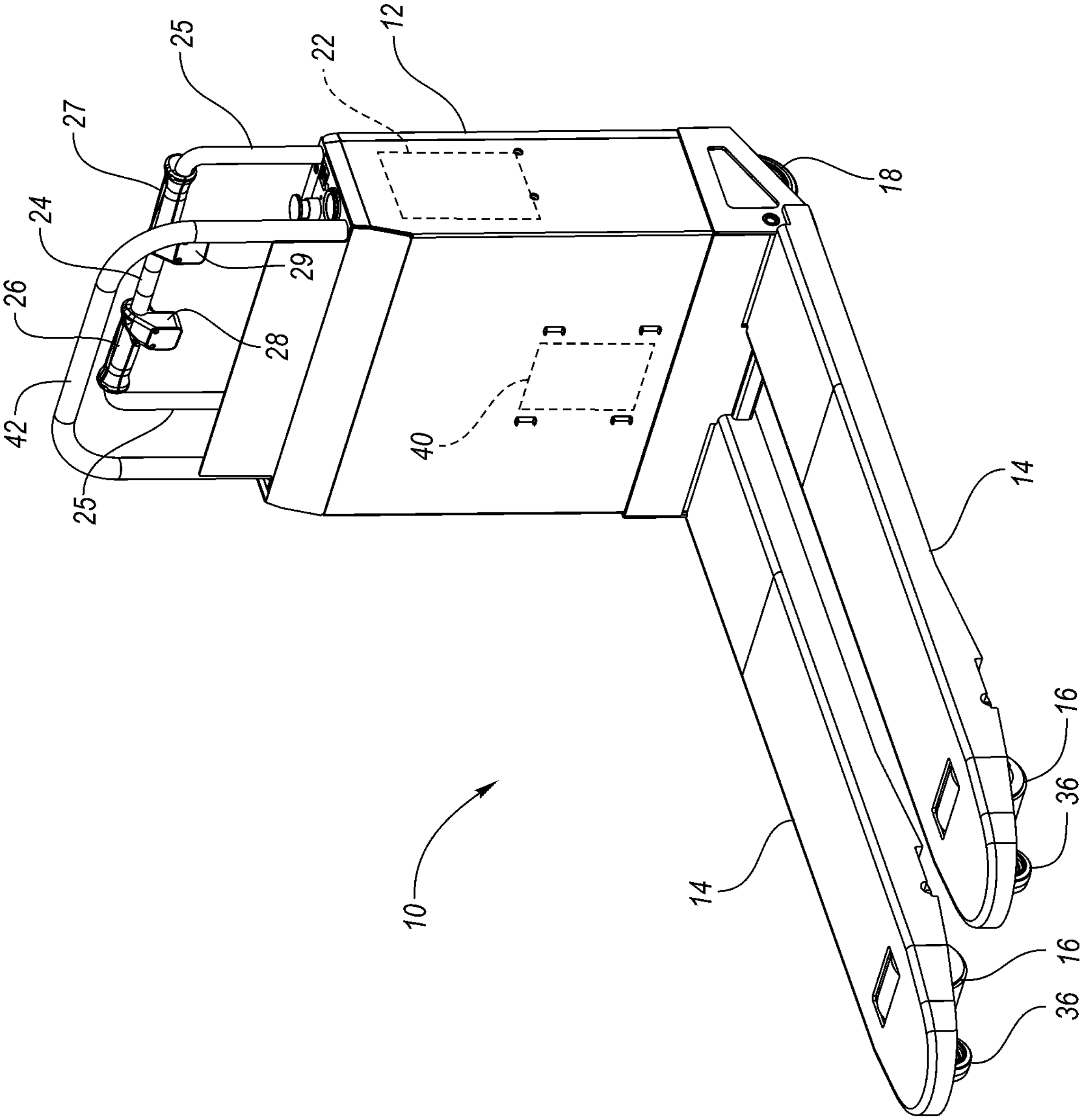
FIG. 1 is a perspective view of a cart according to an example embodiment.

A powered cart 10 for transporting pallets is shown in FIG. 1. The cart 10 includes a lift module or base 12 connected to a pair of tines 14. The base 12 can raise and lower the tines 14, such as by leveraging load wheels 16 supporting outer ends of the tines 14. Rear wheels 18 may support the base 12.

A battery pack 22 is also mounted in the base 12 for driving motors within the load wheels 16. A horizontal handle 24 extends between two vertical bars 25 extending upward from the base 12. The horizontal handle 24 and the two vertical bars 25 are fixed relative to the base 12. A first grip 26 is mounted to the horizontal handle 24 and has a throttle control 28 mounted thereto. A second grip 27 is mounted to the horizontal handle 24 and has a lift control 29 mounted thereto. A backrest bar 42 extends upward from the base 12 forward of the handle 24 and higher than the handle 24. The backrest bar 42 is generally an inverted U-shaped, fixed bar.

The cart 10 includes a lift mechanism 40 for raising and lowering the tines 14. The lift mechanism 40 may be an electro-hydraulic pump, which may be powered by the removable battery pack 22. Alternatively, the lift mechanism 40 may be a hydraulic foot pump or other mechanism for lifting the tines 14 relative to the floor.

Figure 2:
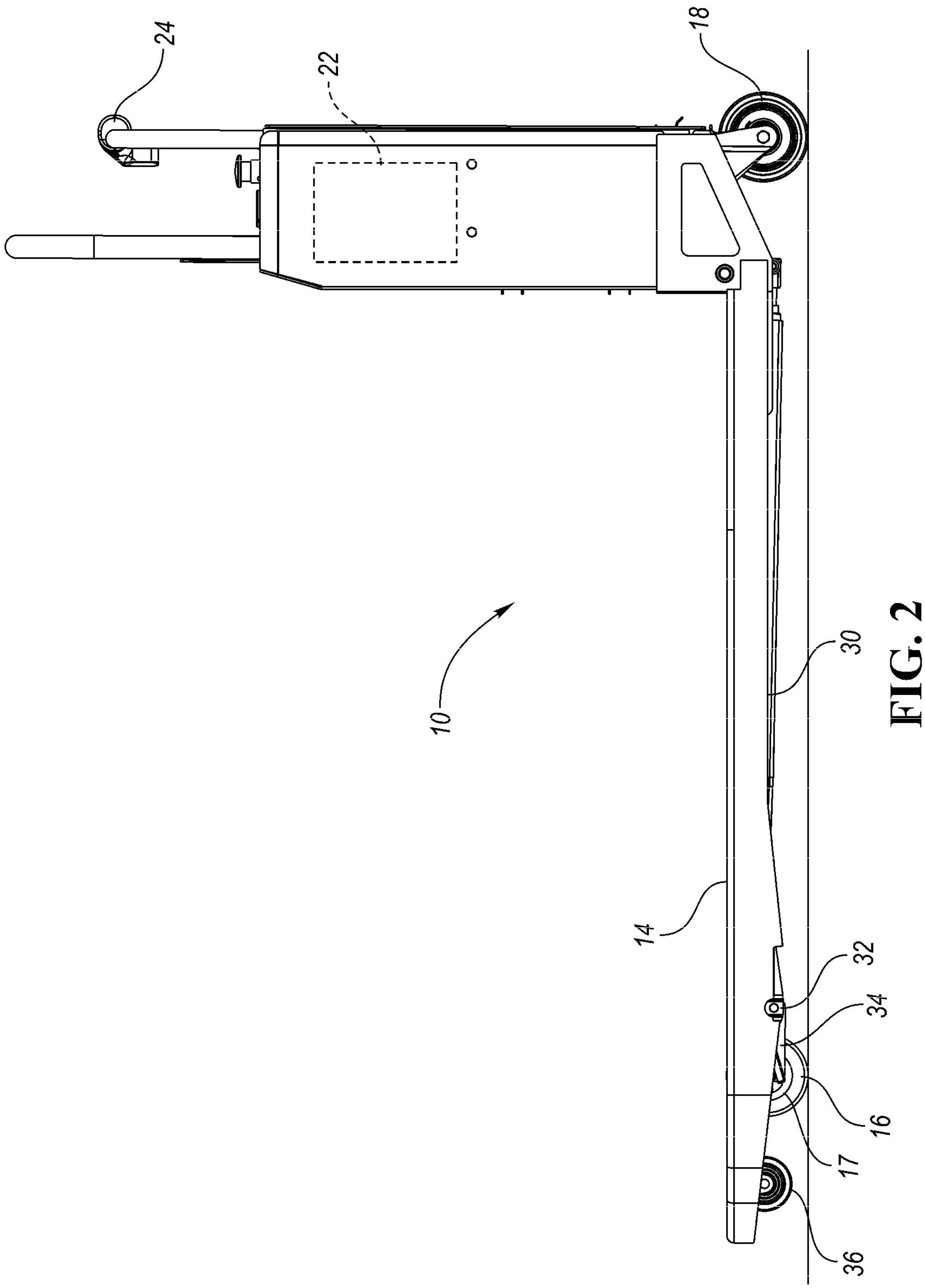
FIG. 2 is a side view of the cart of FIG. 1.

FIG. 2 is a side view of the cart 10. Each load wheel 16 is mounted at the end of a pair of arms 34, which are pivotably mounted at opposite ends to the tine 14 at pivot axis 32. As is well-known, a push rod 30 leverages the arms 34 up and down to raise and lower the load wheels 16. In this example, the push rods 30 may be powered by the lift mechanism 40 as controlled by the lift control 29 (FIG. 1).

The load wheels 16 include hub motors 17 within. The hub motors 17 selectively receive power from the battery pack 22 (FIG. 1) to drive the load wheels 16 rotatably and to drive the cart 10. Both hub motors 17 may be controlled by the single lift control 29 (FIG. 1). A free spinning lead wheel 36 is mounted at the front of each tine 14 and spaced above the floor to assist in contact with curbs, ramps, etc. As another alternative, a hub motor 17 may be provided in only one of the load wheels 16, while the other load wheel is free spinning. As another alternative, the rear wheels 18 may also have hub motors.

As can be seen in FIG. 2, the horizontal handle 24 is positioned forward of a rearmost edge of the rear wheels 18. The horizontal handle 24 is substantially aligned with the axles of the rear wheels 18. The provides a more compact form factor for operating in the aisles of a store (for example).

Figure 3:
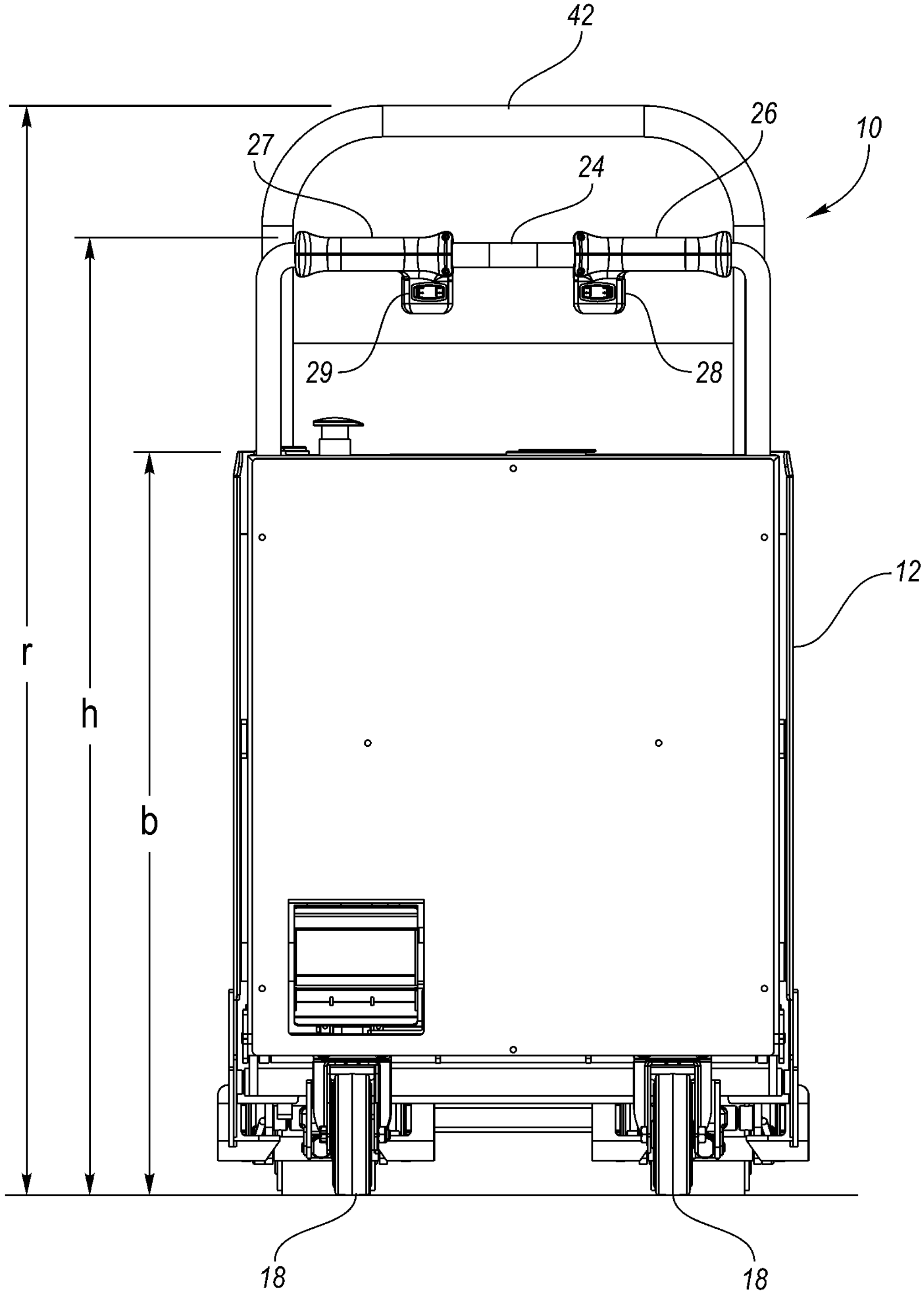
FIG. 3 is a rear view of the cart of FIG. 1.

FIG. 3 is a rear view of the cart 10. As illustrated, the distance b from the floor to an uppermost surface of the base 12 is preferably less than 36 inches and more preferably approximately 30 inches. The distance h from the floor to the uppermost surface of the handle 24 is preferably less than 42 inches and more preferably approximately 39 inches. The distance r from the floor to the uppermost surface of the backrest bar 42 is preferably less than 48 inches, and more preferably approximately 44 inches. Alternatively, the distance r can be greater because the user may also be able to see under the backrest bar 42.

Figure 4:
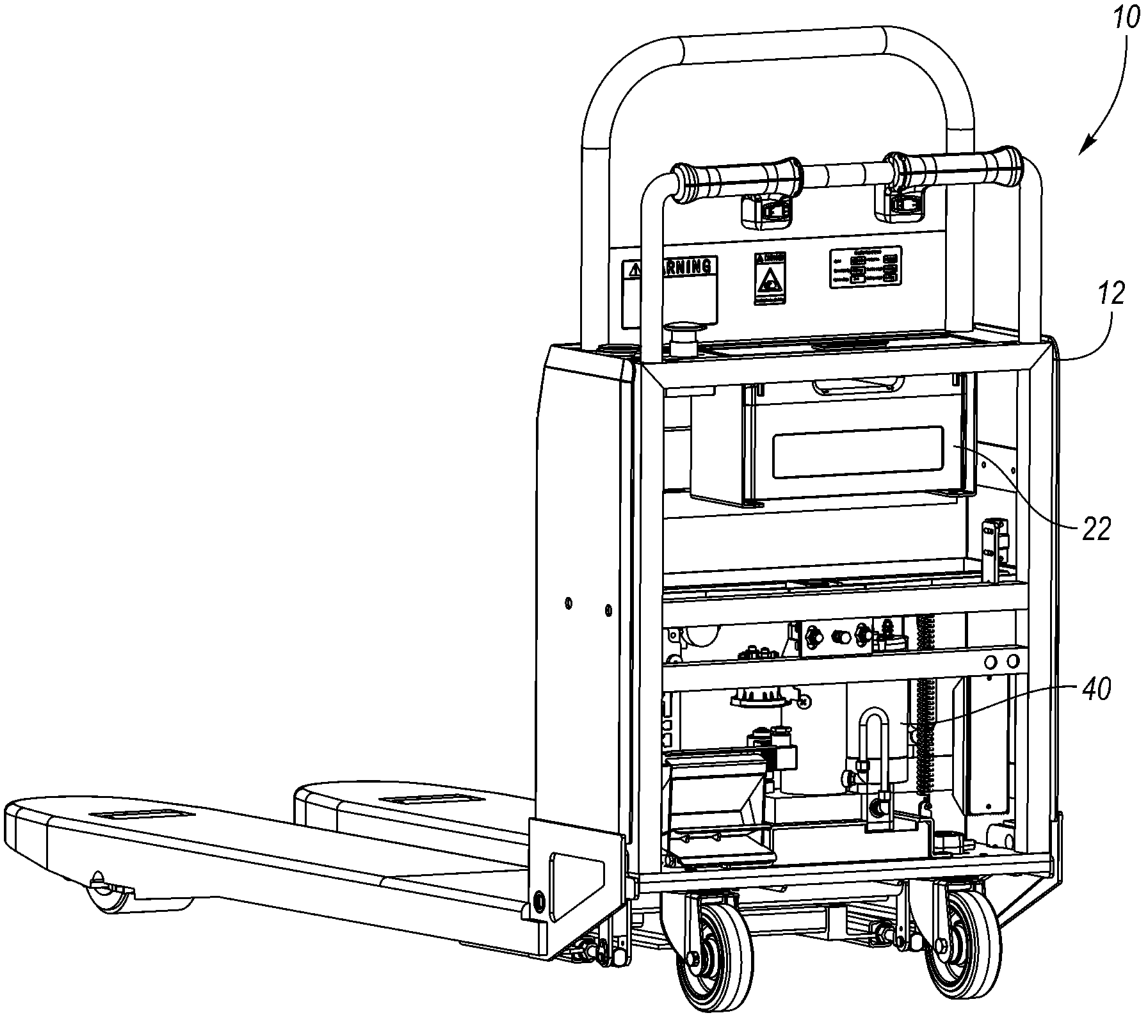
FIG. 4 is a rear perspective view of the cart of FIG. 1 with a back panel removed.

FIG. 4 is a rear perspective view of the cart 10 with the rear cover removed. The battery pack 22 and the lift mechanism 40 are in the base 12.

Figure 5:
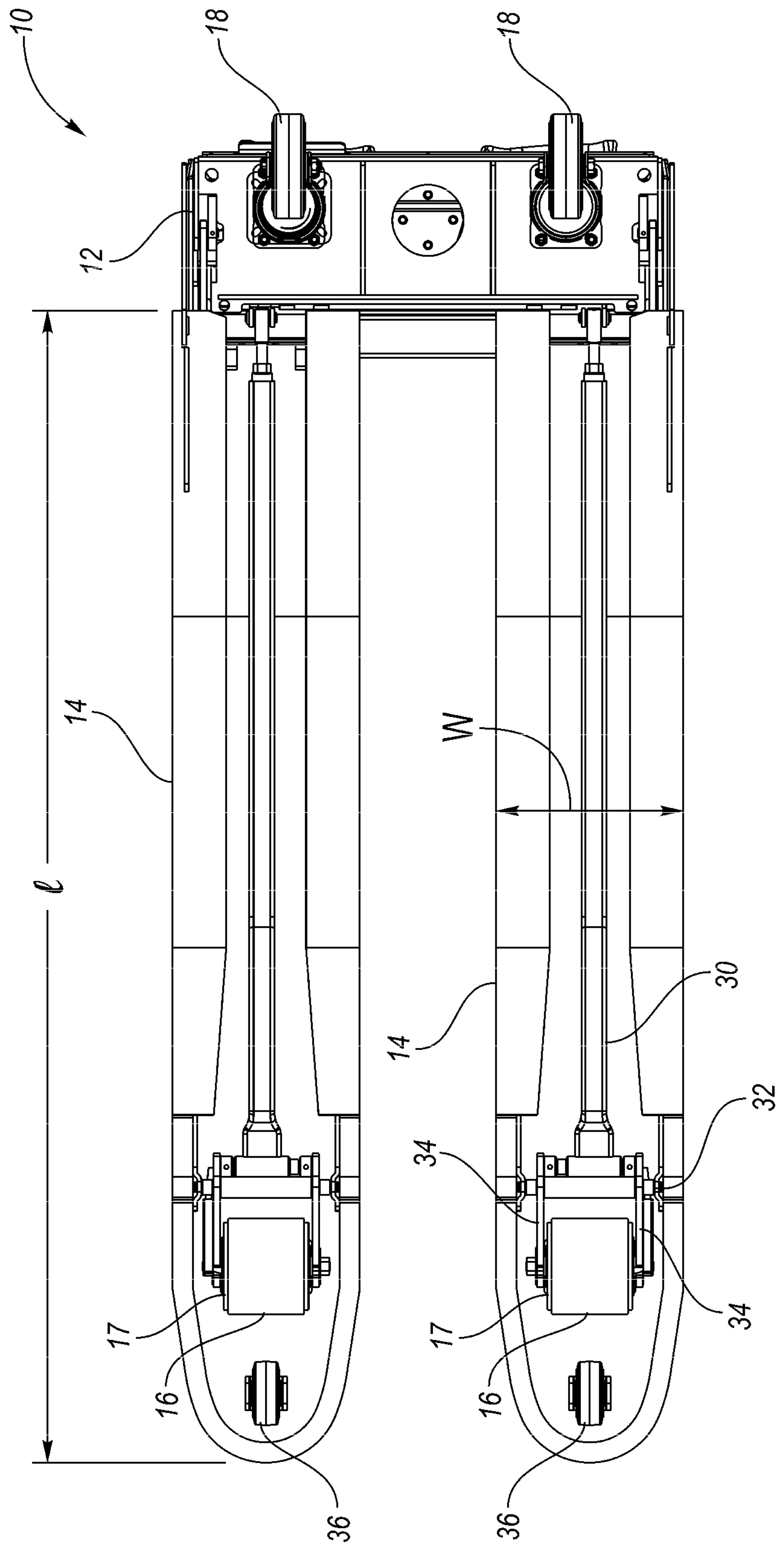
FIG. 5 is a bottom view of the cart of FIG. 1.

FIG. 5 is a bottom view of the cart 10. Again, each load wheel 16 is mounted at the end of a pair of arms 34, which are pivotably mounted at opposite ends to the tine 14 at the pivot axis 32. As is well-known, each push rod 30 leverages the arms 34 up and down to raise and lower the load wheels 16. The tines 14 are preferably wider and longer than is typical. For example, the width w of each of the tines 14 is preferably more than 7 inches, and more preferably between approximately 8½ inches and approximately 9 inches. In this particular example, the width w is approximately 8.8 inches. The length l of each tine 14 is preferably more than 50 inches and more preferably between approximately 52 inches and approximately 53 inches.

Figure 6:
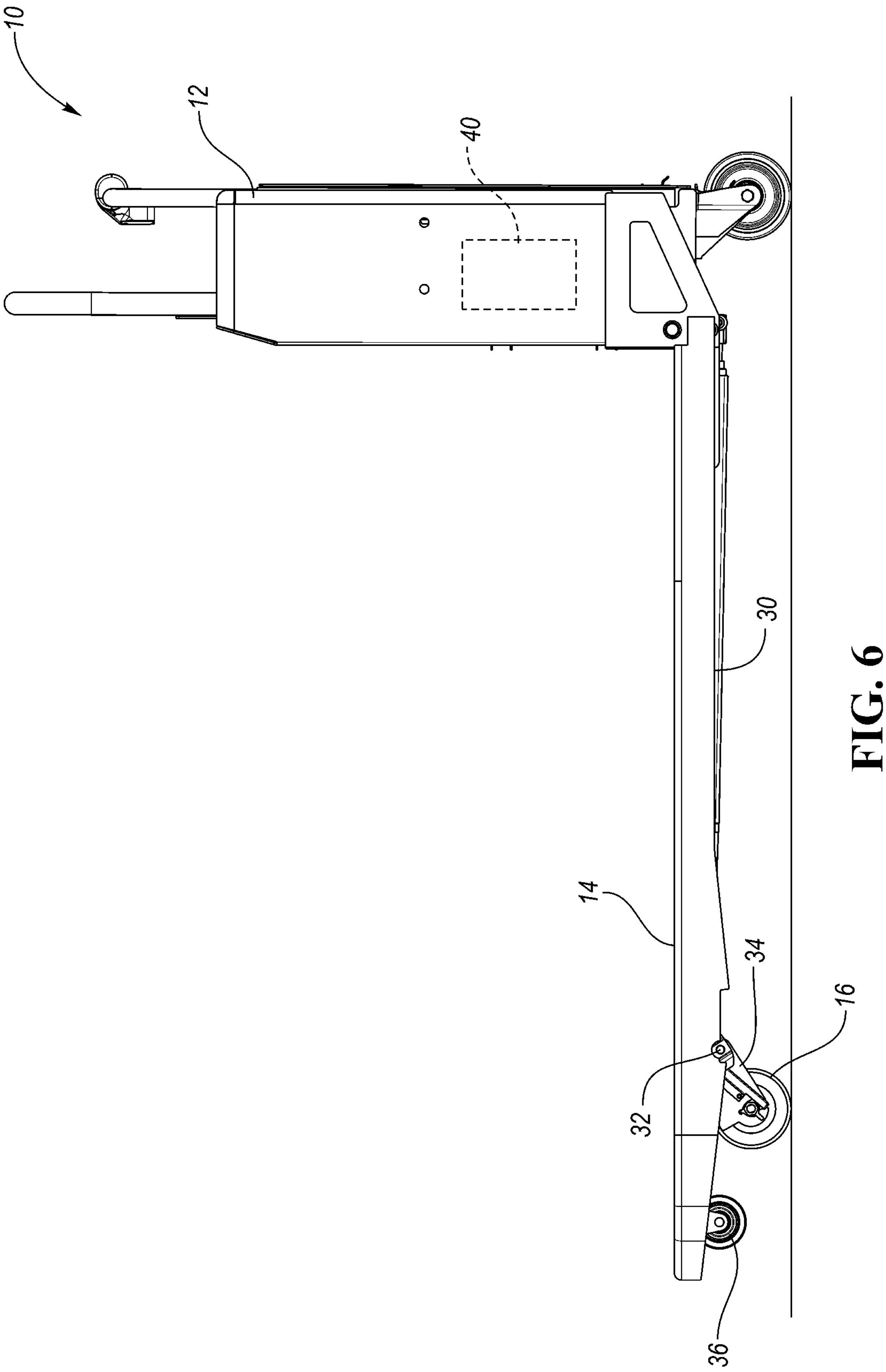
FIG. 6 is a side view of the cart of FIG. 1.

FIG. 6 is a side view of the cart 10 with the tines 14 in the raised position. In a generally known manner, the lift mechanism 40 lifts the rear end of the tines 14 relative to the base 12 while moving the push rods 30 forward to leverage the load wheels 16 away from the front ends of the tines 14. This causes the tines 14 to raise upward relative to the floor and the base 12.

Figure 7:
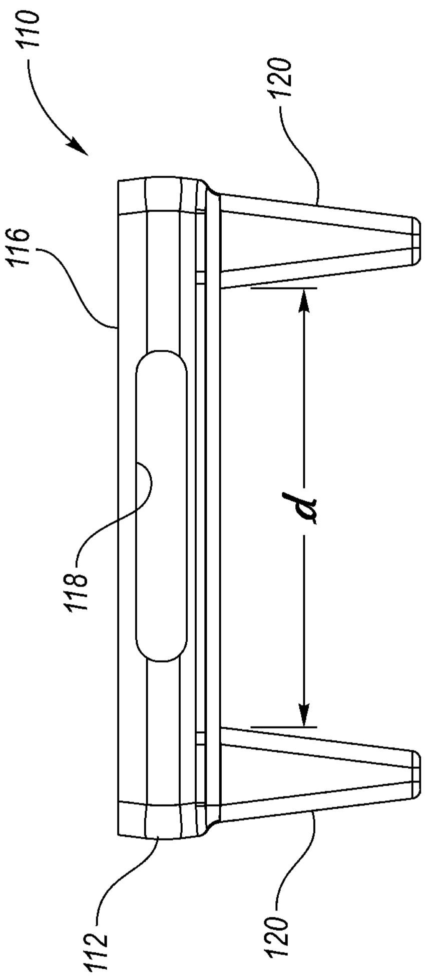
FIG. 7 is an end view of a pallet that can be used with the cart of FIG. 1.
Figure 8:
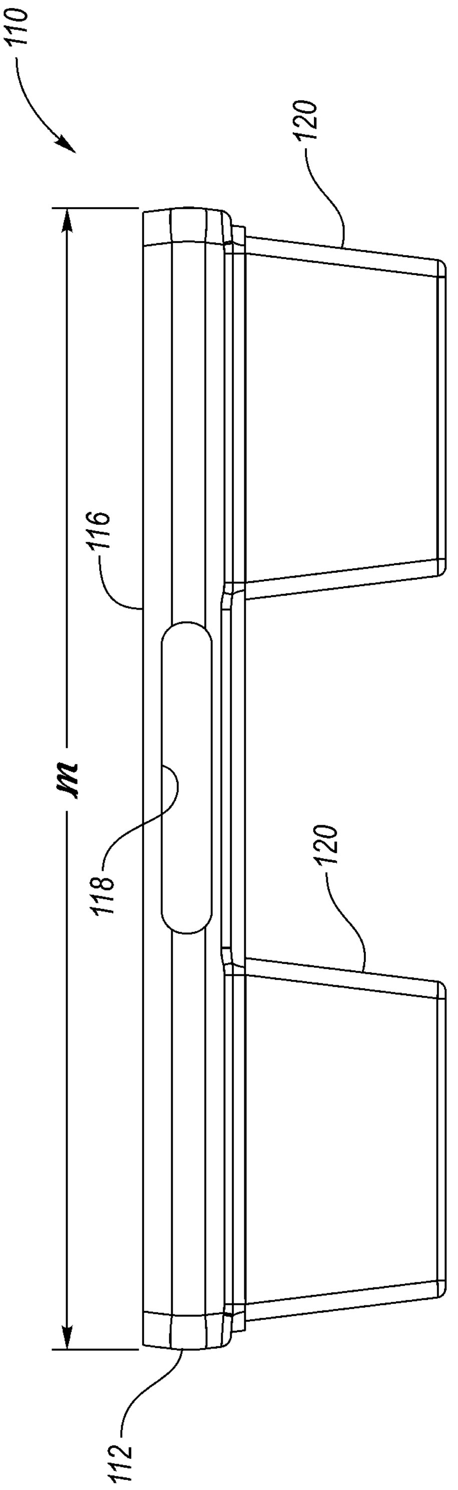
FIG. 8 is a side view of the pallet of FIG. 7.
Figure 9:
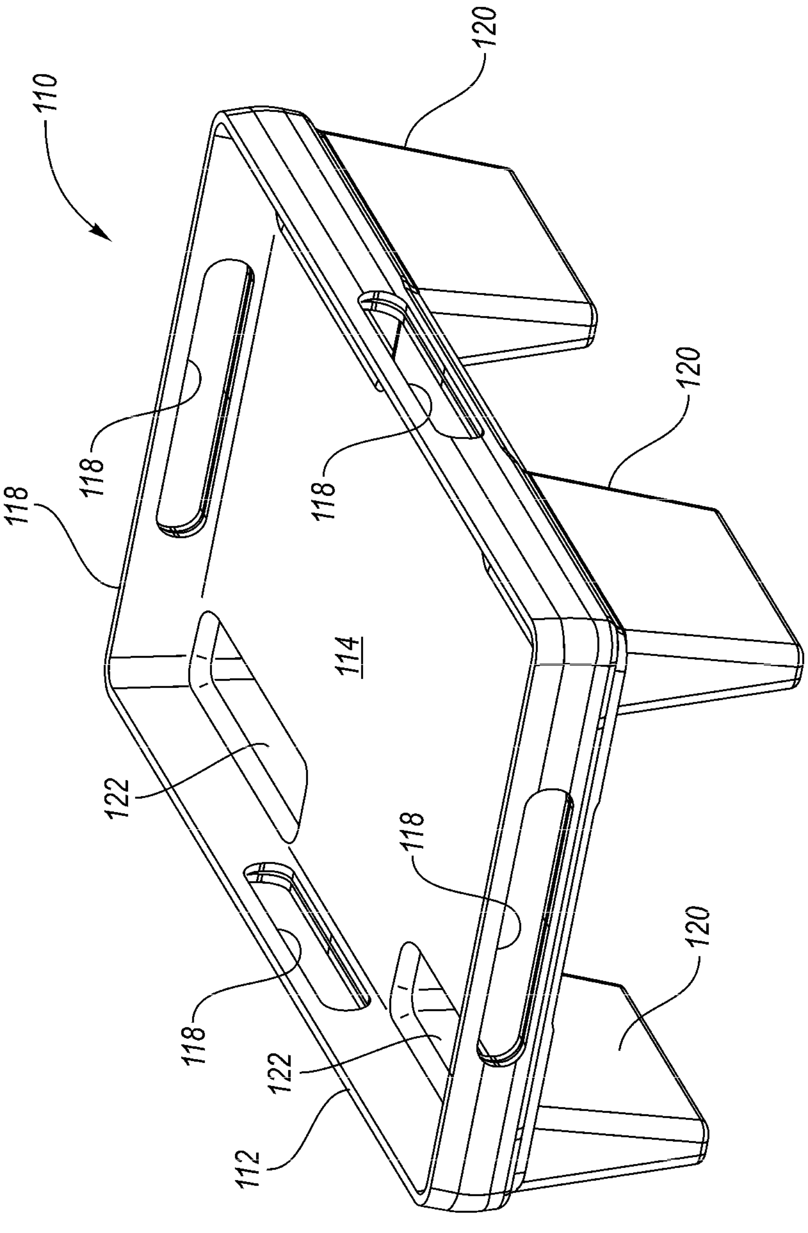
FIG. 9 is a perspective view of the pallet of FIG. 7.

FIGS. 7, 8 and 9 show a pallet 110 that can be used with the cart 10. The pallet 110 includes a deck 112 having an upper wall 114 and a peripheral lip 116 projecting upward from a periphery thereof. Handle openings 118 may be formed through all four sides of the peripheral lip 116. A plurality of feet 120 (in this example, four) extend downward from the deck 112 to support the deck 112 above a ground or floor and to define a tine-receiving opening between adjacent feet 120. The feet 120 are hollow. Openings 122 are formed through the upper wall 114 of the deck 112 leading into the feet 120 such that the feet 120 of an identical pallet 110 could be received through the openings 122 and into the feet 120 in a nested position to reduce the overall stacking height when empty.

The pallet 110 is preferably molded as a single piece of suitable plastic. The pallet 110 is sized to carry a single container, such as a tote. The pallet 110 in this example is approximately 25.2 inches by 14.6 inches.

Referring to FIG. 7, the distance d between the pairs of feet 120 along the short side of the pallet 110 is slightly greater than the width w of the tines 14 (FIG. 5). In this example, the distance d between the feet 120 is between approximately 9 inches and approximately 10 inches, more preferably approximately 9.7 inches. In other words the distance d is approximately ¾ inch to approximately 1¼ inch larger than the width w.

Referring to FIG. 8, the long side of the pallet 110 has a length m which is slightly less than approximately half the length 1 of the tines 14 (FIG. 5). For example, since in this example the length l of the tines 14 is approximately 52¼ inches, the pallet 110 may have a length m which is less than approximately 28 inches and preferably approximately 26 inches and more preferably approximately 25.2 inches.

Figure 10:
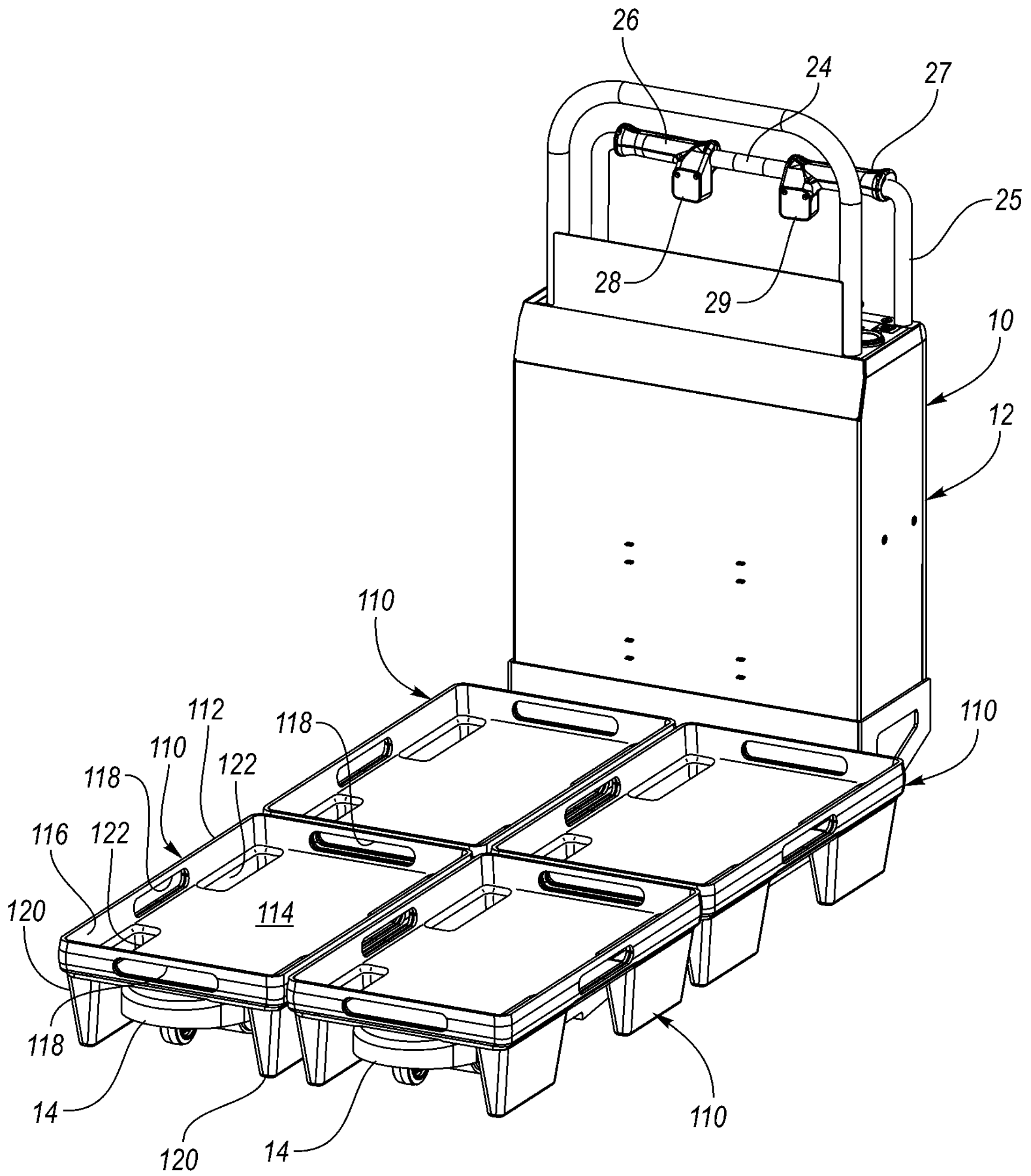
FIG. 10 shows the cart of FIG. 1 with pallets supported on the tines.

As a result, as shown in FIG. 10, a plurality of the pallets 110 (in this example, four) can be supported on the tines 14. In this embodiment, two pallets 110 are received on each tine 14. Since the tines 14 are each a little longer than two of the pallets 110, two pallets 110 can be supported on each tine 14. Also, because the tines 14 are wider than is typical and because the width of each tine is only slightly less than the spacing between the feet of the pallets 110, each pallet 110 is stably supported on each tine 14. In FIG. 10, the pallets 110 are empty.

The tines 14 are wider and longer in length than similar pallet jacks. The wider tines 14 stably support the pallets 110 since each pallet is only supported on one tine 14. The tines 14 extend substantially from the feet 120 on one side of the pallet 110 to the feet 120 on the other side of the pallet 110.

Figure 11:
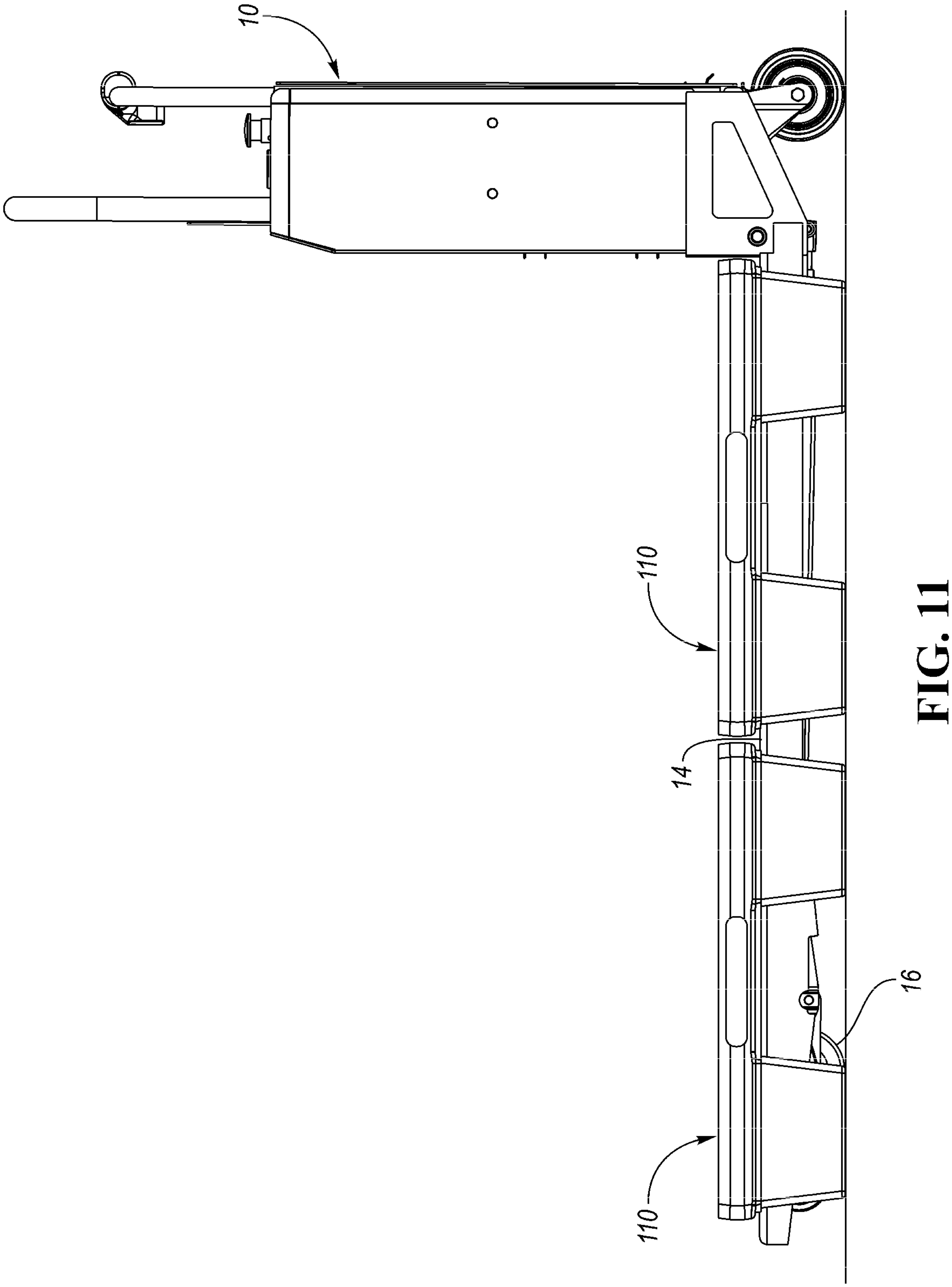
FIG. 11 is a side view of the cart and pallets of FIG. 4.

FIG. 11 is a side view of the cart 10 and pallets 110. As shown in FIG. 11, the tines 14 can be rolled under the pallets 110 when the tines 14 are in the lower position, closer to the floor.

Figure 12:
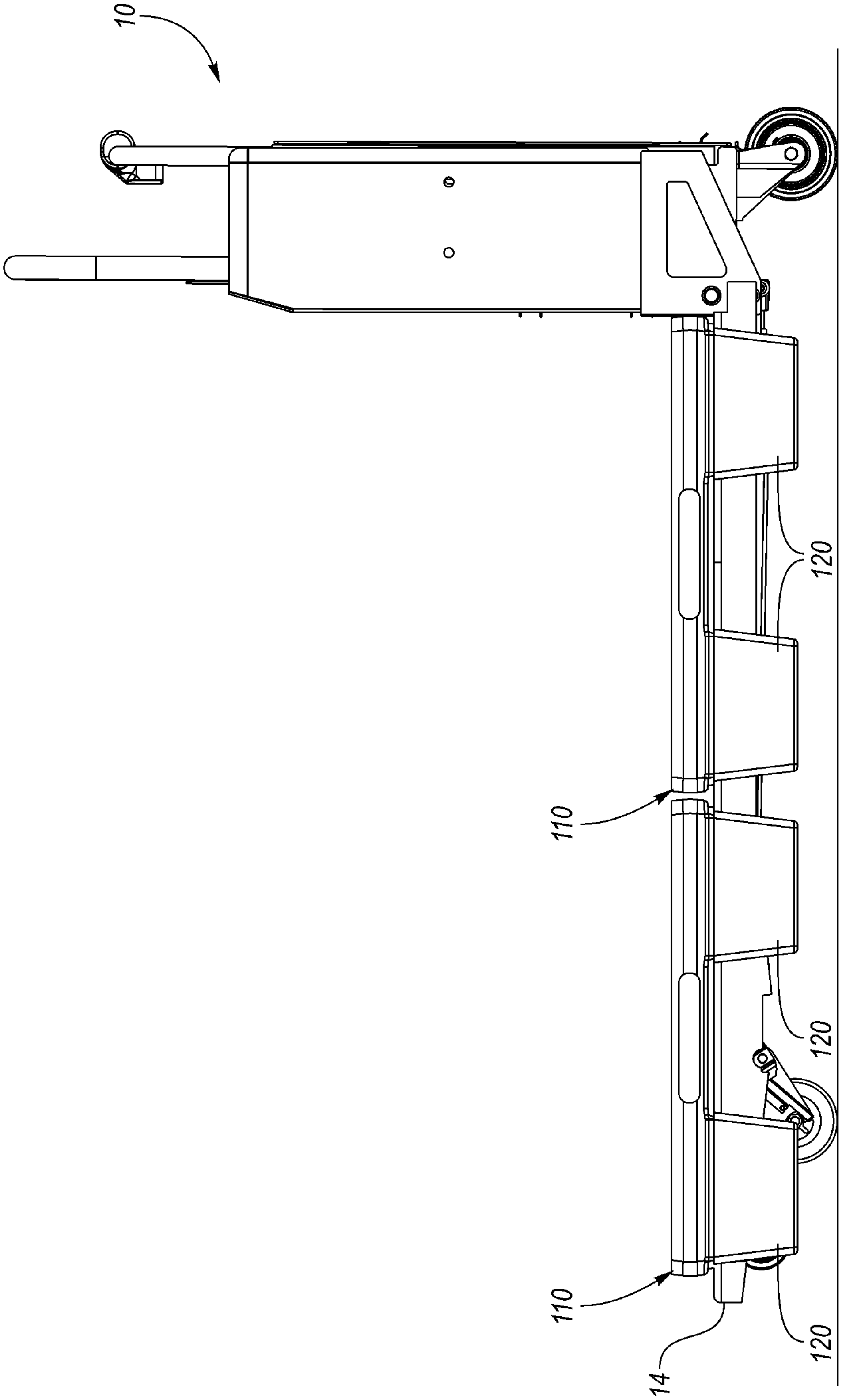
FIG. 12 shows the cart and pallets of FIG. 11 with the tines in the raised position.

As shown in FIG. 12, the tines 14 are then raised relative to the floor, lifting the feet 120 off the floor so that the pallets 110 (and anything stacked on the pallets 110) can be moved by the cart 10.

Figure 13:
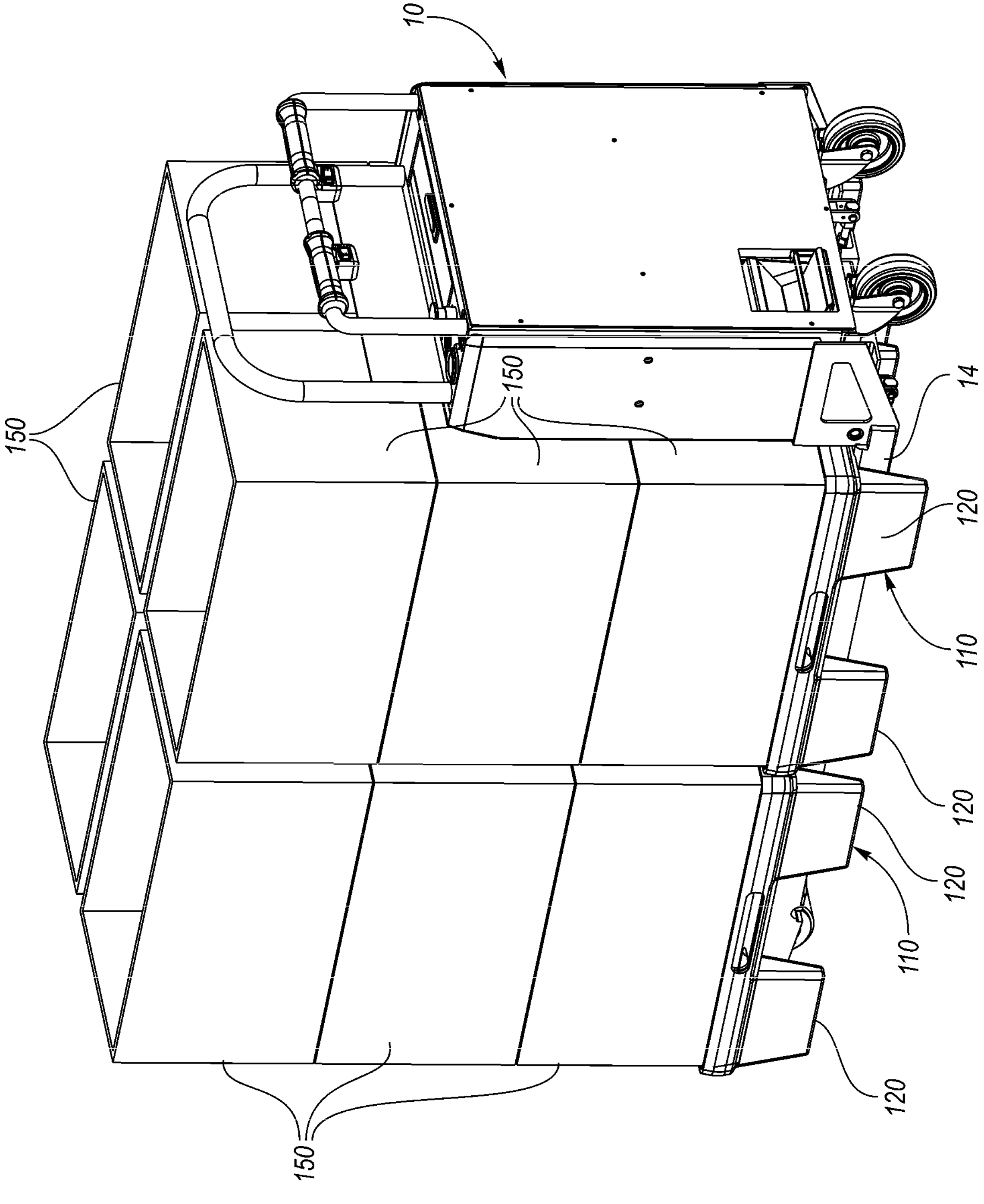
FIG. 13 is a rear perspective view of the cart and pallets of FIG. 12 with totes stacked on the pallets.

FIG. 13 is a perspective view of the cart 10 carrying the pallets 110, which are each loaded with items, such as stacks of containers 150. The containers 150 could be collapsible containers (such as RPCs), attached-lid containers (ALCs), and/or totes (including 180 degree stack-nest totes, totes with bail arms that permit stacking or nesting, etc). The containers 150 may contain grocery items, such as grocery items selected online by a user for curbside pickup or delivery.

Figure 14:
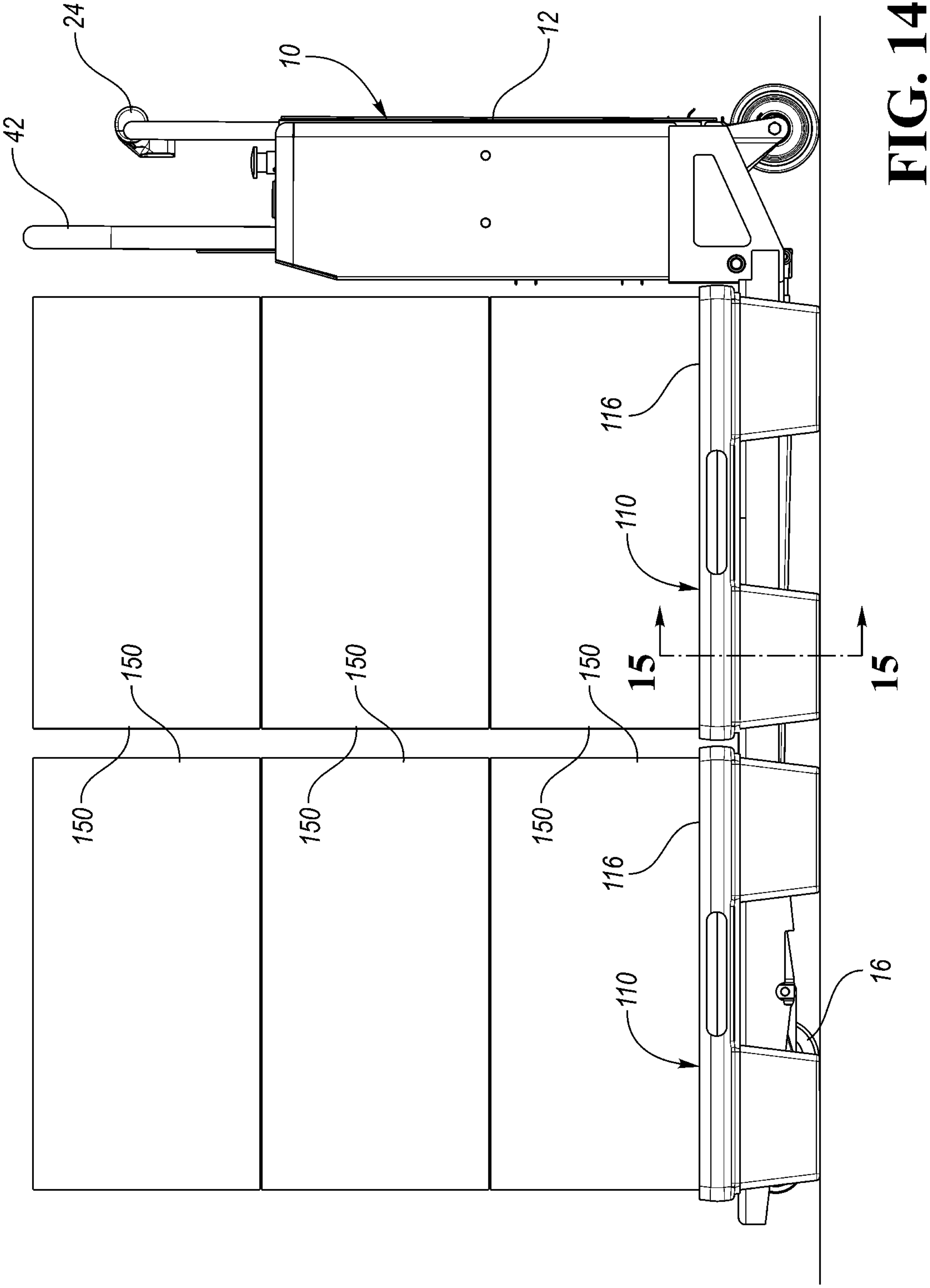
FIG. 14 is a side view of the carts, pallets and totes of FIG. 13.

FIG. 14 is a side view of the cart 10, pallets 110 and containers 150. As shown, each pallet 110 receives the lowermost container 150 partially within the recess formed on the upper surface of the deck 112, i.e. supported on the upper wall 114 and within the peripheral lip 116. Because of the reduced height of the base 12, horizontal handle 24 and backrest bar 42, and by stacking the containers 150 to a height relatively aligned with the backrest bar 42, the user is able to see over the cart 10 and the containers 150.

Figure 15:
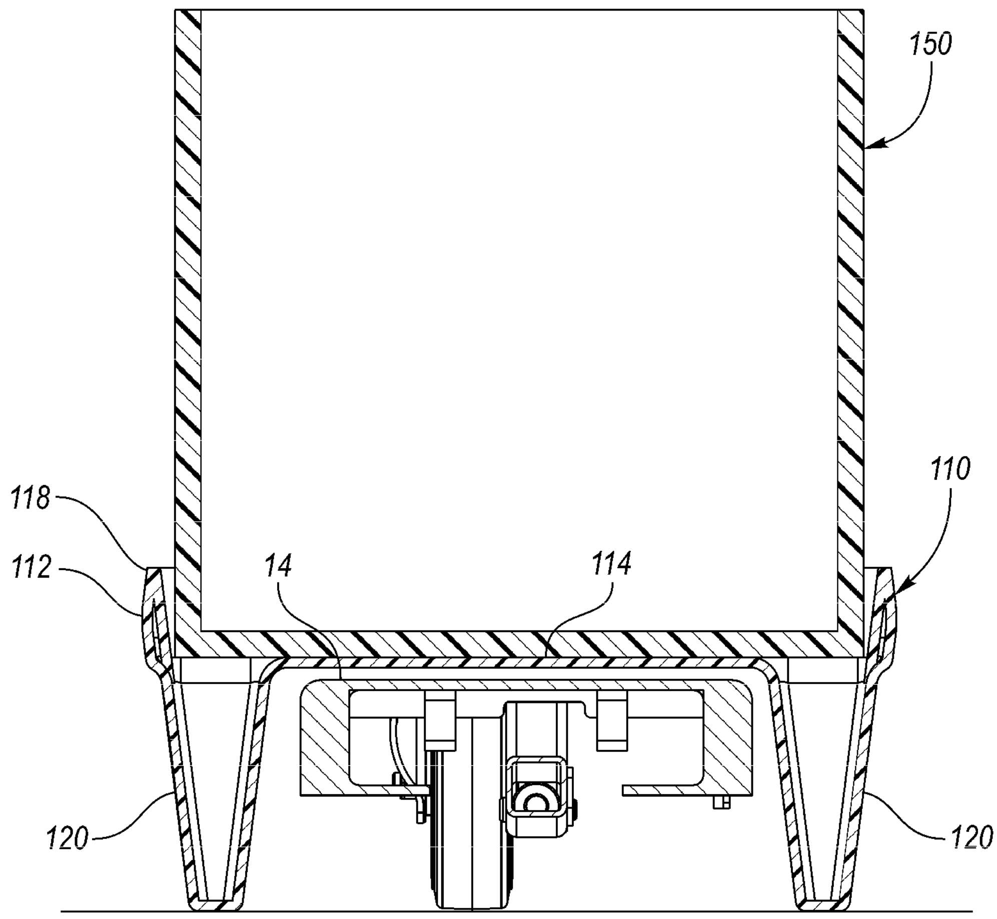
FIG. 15 is a section view taken along line 15-15 of FIG. 14.

FIG. 15 is a section view taken along line 15-15 of FIG. 14. As can also be seen in FIG. 15, the width of the tines 14 is such that they are very close (e.g. ¼ to ½") to the inner wall of the feet 120. The wide tine 14 provides stability to the pallet 110 stacked thereon when lifted. The inner walls of the feet 120 are angled outward as they extend downward from the deck 112. As can also be seen in FIG. 15, the container 150 fits tightly within the peripheral lip 116 of the deck 112 of the pallet 110. The peripheral lip 116 may be double-walled, with a space between the walls for increased strength, as shown.

The containers 150 may each have an associated RFID tag. The powered cart 10 may have an RFID reader mounted thereon for reading the RFID tags of containers 150 carried by the cart 10.

The powered cart 10 disclosed herein increases efficiencies by reducing the amount of time and labor an operator needs to move product. For example, the containers 150 may each contain grocery items that a customer has ordered online for delivery or pickup. Each container 150 would contain the grocery items for only one customer order, but a customer order may fill several containers 150. Similar items may be groups, e.g. the containers 150 with items that need to be refrigerated could be stacked on one pallet 110, while the containers 150 with items that need to be frozen could be stacked on another pallet 110, and the containers 150 with items that can be held at room temperature could be stacked on yet another pallet 110. As appropriate, each pallet 110 with its containers 150 could be held in a refrigerator, a freezer or in a storeroom until near delivery or pickup time. The store worker would then gather up these different pallets 110 in different locations with the cart 10, move all of them out to the parking lot adjacent the store, and either place them in the customers' vehicles or into a delivery vehicle.

The electric hub motors 17 and battery pack 22 provide propulsion in forward and reverse to the powered cart 10. The powered drive is especially useful when moving heavy loads across parking lots, up ramps and slopes, and over thresholds that may be encountered throughout the process. The battery pack 22 may also provide power to lift the pallet load, or a hydraulic foot pump may be utilized, similar to an existing delivery cart 10.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A cart comprising:

a base;

a pair of rear wheels supporting the base;

a pair of tines extending forward of the base;

a load wheel below forward ends of each of the pair of tines for raising and lowering the tine; and a handle extending upward from the base, the handle including a horizontal handle, wherein the horizontal handle is fixed in a position substantially aligned with axles of the rear wheels, wherein the horizontal handle has a lift control mounted thereto.

2. The cart of claim 1 wherein the load wheels each include a hub motor for powering the cart.

3. The cart of claim 2 wherein each of the pair of tines has a width that is more than seven inches.

4. The cart of claim 3 wherein each of the pair of tines has a length that is more than fifty inches.

5. The cart of claim 4 including a first horizontal grip mounted to the horizontal handle, wherein the first horizontal grip has the lift control mounted thereto.

6. The cart of claim 5 including a second horizontal grip mounted to the horizontal handle, wherein the second horizontal grip has a throttle control mounted thereto.

7. The cart of claim 6 wherein the horizontal handle is configured to be less than forty-two inches above a floor on which the cart is supported.

8. The cart of claim 7 further including a backrest extending upward from the base forward of the horizontal handle, wherein the backrest is configured to be less than forty- eight inches above the floor on which the cart is supported.

9. The cart of claim 8 in combination with a plurality of pallets, the pair of tines including a first tine and a second tine, the plurality of pallets including a first pallet supported directly on the first tine but not on the second tine, a second pallet supported directly on the first tine but not the second tine, the plurality of pallets further including a third pallet supported directly on the second tine but not the first tine and a fourth pallet supported directly on the second tine but not the first tine.

10. The combination of claim 9 further including a plurality of containers stacked on each of the plurality of pallets.

11. The combination of claim 10 wherein each of the plurality of pallets includes a deck, a plurality of feet extending downward of the deck, and a peripheral lip extending upward about a periphery of the deck.

12. The combination of claim 11 wherein each of the plurality of pallets includes openings through the deck for receiving the feet of an identical pallet such that the plurality of pallets are nestable when empty.

13. In combination:

a cart having a first tine and a second tine extending forward of a base, the cart further including a load wheel below forward ends of each of the first tine and the second tine for raising and lowering the first tine and the second tine;

a first pallet supported directly on the first tine but not on the second tine, a second pallet supported directly on the first tine but not the second tine; and a third pallet supported directly on the second tine but not the first tine and a fourth pallet supported directly on the second tine but not the first tine.

14. The combination of claim 13 further including a plurality of containers stacked on each of the first pallet, the second pallet, the third pallet and the fourth pallet.

15. The combination of claim 14 wherein each of the first, second, third, and fourth pallets includes a deck, a plurality of feet extending downward of the deck, and a peripheral lip extending upward about a periphery of the deck.

16. The combination of claim 15 wherein each of the first, second, third, and fourth pallets includes openings through the deck for receiving the feet of an identical pallet such that the first, second, third, and fourth pallets are nestable when empty.

17. A cart comprising:

a base;

a pair of rear wheels supporting the base;

a pair of tines extending forward of the base, wherein each of the pair of tines has a width that is more than seven inches and a length that is more than fifty inches;

a load wheel below forward ends of each of the pair of tines for raising and lowering the pair of tines; and a handle extending upward from the base, the handle including a horizontal handle, wherein the horizontal handle is substantially aligned with axles of the rear wheels.

18. The cart of claim 17 wherein the horizontal handle is fixed relative to the base, the cart further including:

a first horizontal grip mounted to the horizontal handle, wherein the first horizontal grip has a lift control mounted thereto; and a second horizontal grip mounted to the horizontal handle, wherein the second horizontal grip has a throttle control mounted thereto.

19. The cart of claim 18 wherein the horizontal handle is configured to be less than forty-two inches above a floor on which the cart is supported, the cart further including a backrest extending upward from the base forward of the horizontal handle, wherein the backrest is configured to be less than forty-eight inches above the floor on which the cart is supported.

20. The cart of claim 17 in combination with a plurality of pallets, the pair of tines including a first tine and a second tine, the plurality of pallets including a first pallet supported directly on the first tine but not on the second tine and a second pallet supported directly on the first tine but not the second tine, the plurality of pallets further including a third pallet supported directly on the second tine but not the first tine and a fourth pallet supported directly on the second tine but not the first tine.

21. The combination of claim 20 further including a plurality of containers stacked on each of the plurality of pallets, wherein each of the plurality of pallets includes a deck, a plurality of feet extending downward of the deck, and a peripheral lip extending upward about a periphery of the deck, wherein each of the plurality of pallets includes openings through the deck for receiving the plurality of feet of an identical pallet such that the pallets are nestable when empty.

22. The combination of claim 21 wherein each of the pair of tines has a width that is between approximately 8½ inches and approximately 9 inches.

23. The cart of claim 17 wherein each of the pair of tines has a width that is between approximately 8½ inches and approximately 9 inches.

24. The cart of claim 1 wherein the horizontal handle has a throttle control mounted thereto.

25. The cart of claim 24 wherein the horizontal handle is configured to be less than forty-two inches above a floor on which the cart is supported.

26. The cart of claim 25 further including a backrest extending upward from the base forward of the horizontal handle, wherein the backrest is configured to be less than forty-eight inches above the floor on which the cart is supported.

* * * * *